United States Patent [19]

Johansson

[11] Patent Number: 4,874,908
[45] Date of Patent: Oct. 17, 1989

[54] WIRING HARNESS

[75] Inventor: Ronald C. Johansson, Stillwater, Minn.

[73] Assignee: Minnesota Mining and Manufacturing Company, St. Paul, Minn.

[21] Appl. No.: 67,763

[22] Filed: Jul. 8, 1987

[51] Int. Cl.⁴ .................. B60R 16/02; H02G 3/02
[52] U.S. Cl. .................. 174/72 A; 174/112;
  248/68.1; 248/71; 439/34; 439/97; 439/165;
  439/402; 439/620
[58] Field of Search .............. 174/71 R, 72 R, 72 A,
  174/72 C, 88 R, 112, 117 R, 117 F, 117 AS;
  307/10 R, 147; 361/428; 439/31, 34, 95, 97,
  165, 214, 215, 216, 402, 505, 540, 567, 620, 623;
  138/111; 248/68.1, 71, 73, 74.1, 74.2, 74.4, 74.5

[56] References Cited

U.S. PATENT DOCUMENTS

| | | | |
|---|---|---|---|
| 2,595,452 | 5/1952 | Geist et al. | 174/95 |
| 2,831,049 | 4/1958 | Cabral | 174/117 A |
| 2,933,550 | 4/1960 | Cole et al. | 174/72 A X |
| 2,958,018 | 10/1960 | Kocmich | 174/117 F X |
| 3,023,692 | 3/1962 | Crown | 174/72 A X |
| 3,168,617 | 2/1965 | Richter | 174/117 F F |
| 3,210,032 | 10/1965 | Van Slyke | 248/73 |
| 3,459,878 | 8/1969 | Gressitt et al. | 174/112 |
| 3,511,921 | 5/1970 | Pasternak | 174/72 R X |
| 3,576,518 | 4/1971 | Bazille, Jr. et al. | 439/402 |
| 3,733,428 | 5/1973 | Fry | 174/72 A |
| 3,816,818 | 6/1974 | Meier | 439/412 |
| 3,819,848 | 6/1974 | Fry | 174/72 A |
| 3,861,015 | 1/1975 | Hooven | 174/72 A X |
| 3,896,259 | 7/1975 | Fry | 174/72 A |
| 3,898,371 | 8/1975 | Bridgett | 174/72 A |
| 3,900,241 | 8/1975 | Fry | 174/72 A X |
| 3,994,090 | 11/1976 | Wheeler | 174/112 X |
| 4,000,558 | 1/1977 | Cahill | 174/72 A X |
| 4,030,799 | 6/1977 | Venaleck | 439/405 |
| 4,051,383 | 9/1977 | Dola | 174/72 A X |
| 4,065,199 | 12/1977 | Andre et al. | 174/72 A X |
| 4,210,773 | 7/1980 | Haley et al. | 174/72 A |
| 4,239,319 | 12/1980 | Gladd et al. | 439/620 |
| 4,280,062 | 7/1981 | Miller et al. | 361/428 X |
| 4,300,284 | 11/1981 | Reeder | 174/112 X |
| 4,315,662 | 2/1982 | Greenwood et al. | 174/88 R X |
| 4,373,261 | 2/1983 | Long, Jr. | 29/861 |
| 4,381,208 | 4/1983 | Baverstock | 174/72 A X |
| 4,415,765 | 11/1983 | Iwasa et al. | 174/72 A |
| 4,424,627 | 1/1984 | Tarbox | 174/72 A X |
| 4,460,225 | 7/1984 | Moore et al. | 439/502 |
| 4,494,520 | 1/1985 | Hurwitz | 174/72 A X |

FOREIGN PATENT DOCUMENTS

| | | | |
|---|---|---|---|
| 197455 | 4/1958 | Austria | 174/117 F |
| 811116 | 8/1951 | Fed. Rep. of Germany | 174/175 |
| 938797 | 2/1956 | Fed. Rep. of Germany | 174/117 F |
| 2048279 | 4/1972 | Fed. Rep. of Germany | 174/72 A |
| 2146847 | 3/1973 | Fed. Rep. of Germany | 439/620 |
| 2529258 | 10/1976 | Fed. Rep. of Germany | 174/72 A |
| 148999 | 6/1981 | Fed. Rep. of Germany | . |
| 3333709 | 6/1984 | Fed. Rep. of Germany | 174/72 R |
| 3609704 | 9/1987 | Fed. Rep. of Germany | 174/72 A |
| 3616649 | 11/1987 | Fed. Rep. of Germany | 174/72 A |
| 1559509 | 1/1969 | France | 174/72 A |
| 2240602 | 3/1975 | France | 174/117 A |
| 55-44084 | 3/1980 | Japan | 248/68.1 |
| 58-8425 | 1/1983 | Japan | 174/72 A |
| 316918 | 12/1956 | Switzerland | 174/117 F |
| 555745 | 9/1943 | United Kingdom | 174/72 A |
| 897151 | 5/1962 | United Kingdom | 174/72 A |
| 2010019 | 6/1979 | United Kingdom | 174/72 A |

Primary Examiner—Laramie E. Askin
Attorney, Agent, or Firm—Donald M. Sell; Walter N. Kirn; Leland D. Schultz

[57] ABSTRACT

A wiring harness and support structure for conveying energy with respect to the support structure. The wiring harness includes a row of wires extending through at least two pads. The pads are molded about the wires intermediate the ends of the wires. The pads longitudinally hold the wires and support the wires in spaced relationship with respect to each other. At least two of the pads are mounted on the support structure to support and position the wires with respect to the support structure. The wires may be interconnected within a pad or connected externally of a pad. An electrical device may be mounted within a pad to interconnect at least two wires, or to connect a wire externally of a pad.

23 Claims, 14 Drawing Sheets

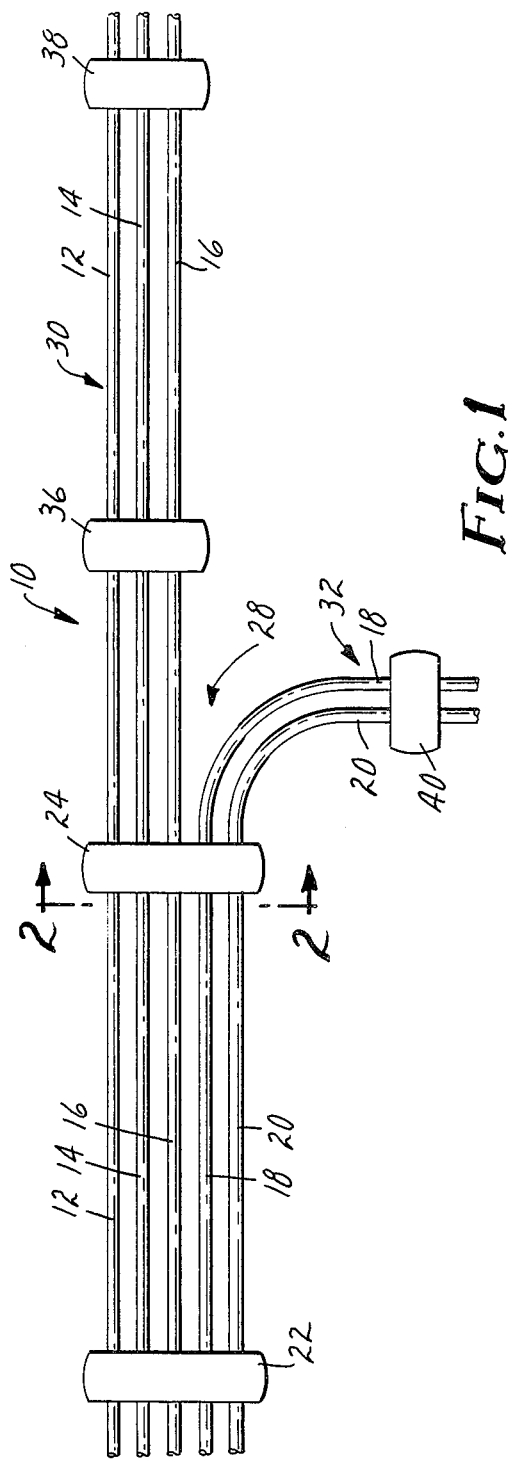
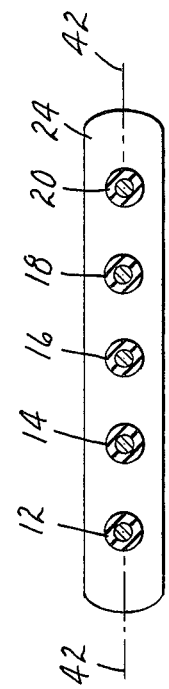
FIG.1
FIG.2

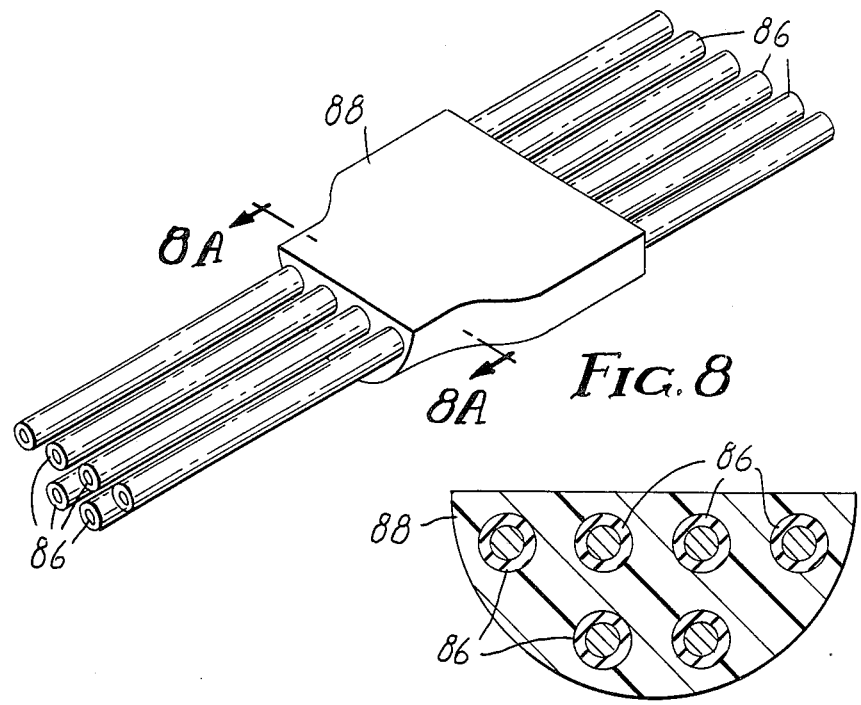
FIG. 8
FIG. 8A
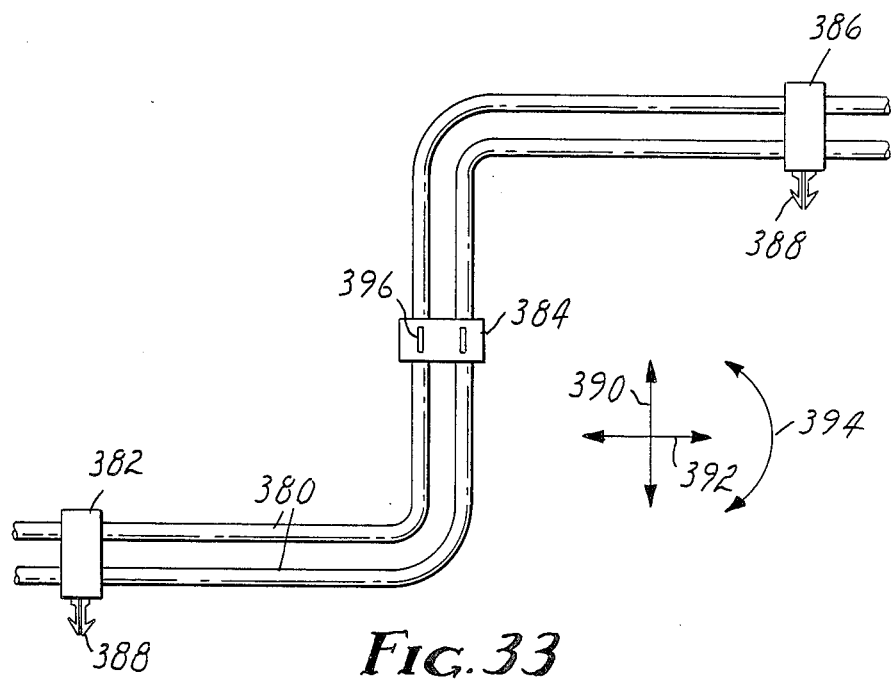
FIG. 33

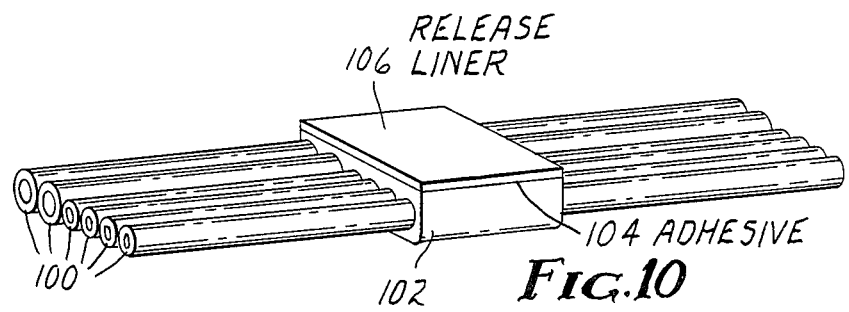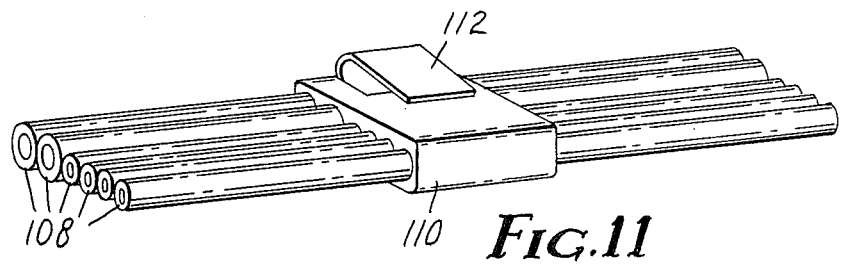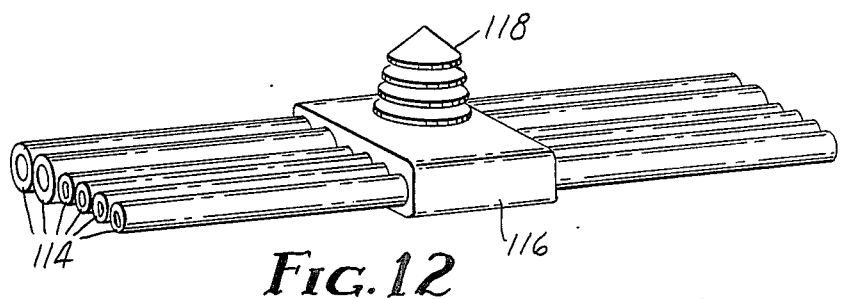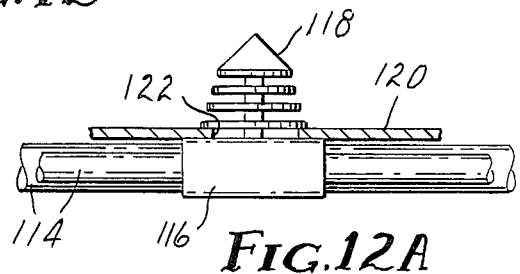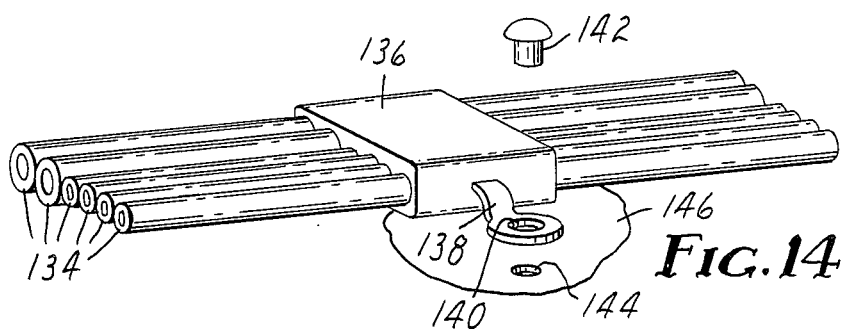

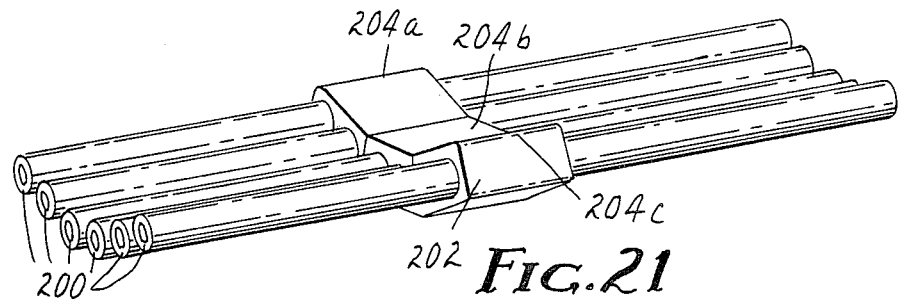
FIG. 21
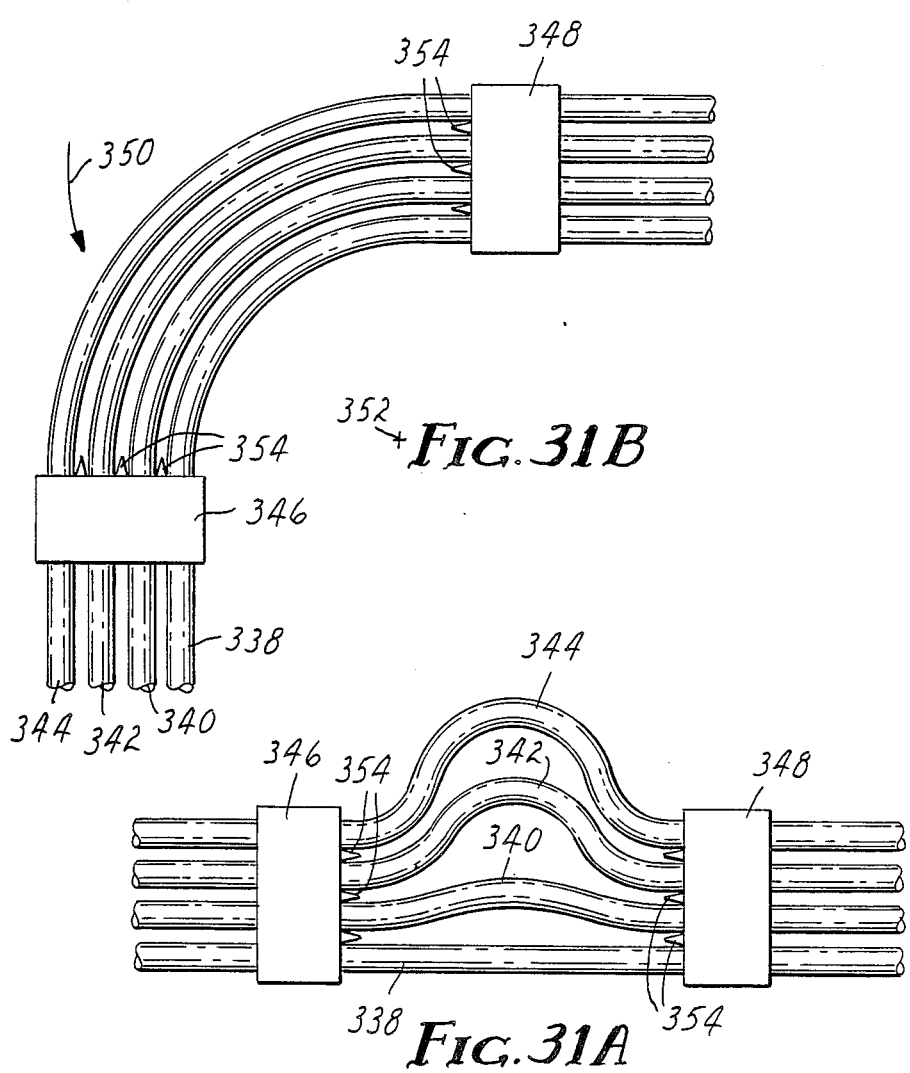
FIG. 31B
FIG. 31A

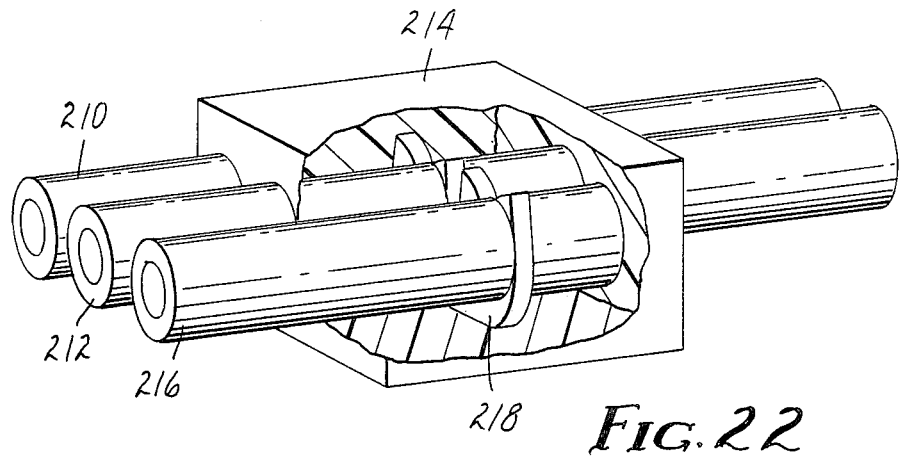
FIG. 22
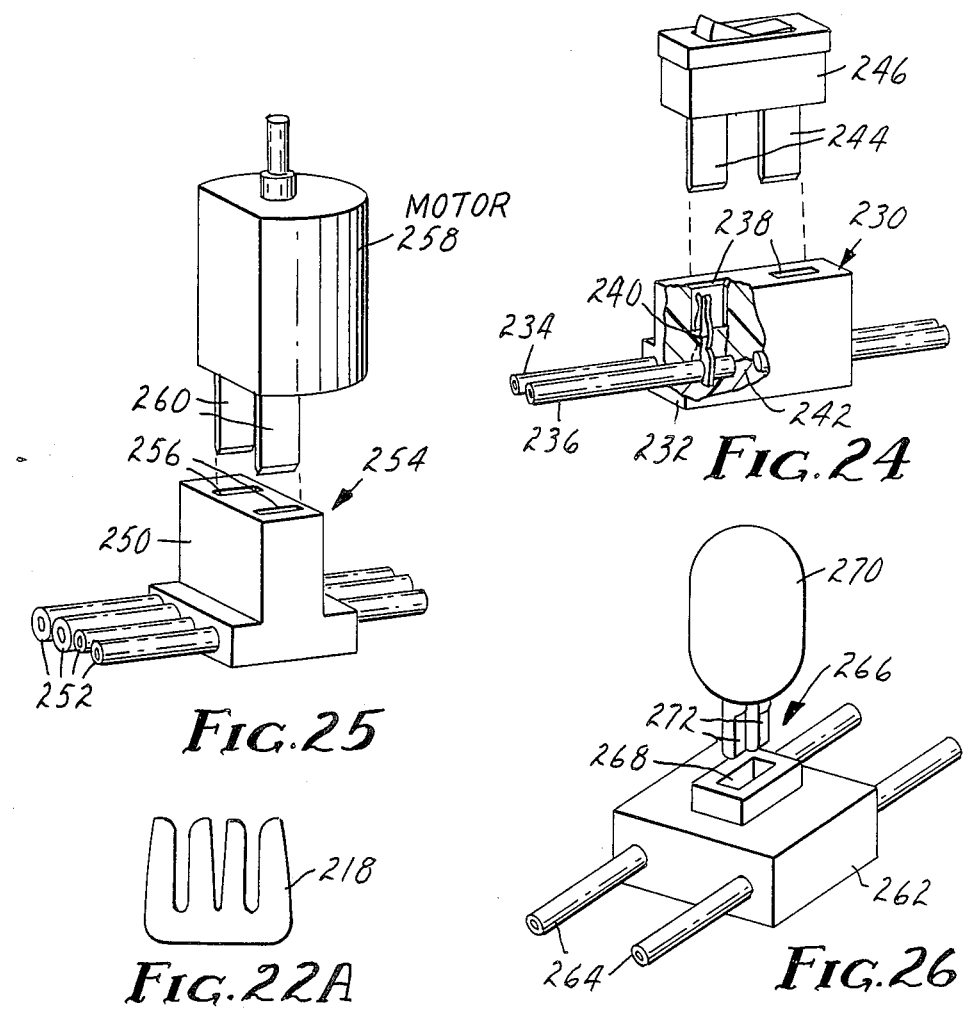
FIG. 25
FIG. 24
FIG. 22A
FIG. 26

WIRING HARNESS

FIELD OF THE INVENTION

This invention relates to wiring harnesses for use with support structures.

BACKGROUND OF THE INVENTION

Wiring harnesses have been developed consisting of a group of wires of various lengths and diameters for conveying energy such as electrical current or light signals. Typically, the wires are secured together in a generally cylindrical bundle, such as by cable ties, tubing, lacing or by being helically wrapped by a length of pressure-sensitive adhesive tape. The wiring harness may be separated into a main cable and one or more branch cables, separately secured into bundles. The ends of the wires may be connected to various devices, such as electrical components, printed circuit boards or other wiring harnesses.

Frequently, a wiring harness is provided for use in conveying energy with respect to a support structure, such as the body of a vehicle or a machine. In applications in vehicles such as automobiles, airplanes, boats and the like, or in appliances such as clothes washers and dryers, severe space limitations in thickness are frequently encountered. For example, in constructing a vehicle, such as an automobile, it is necessary to convey electrical power and signals between a source of electrical power and various components of the automobile such as tail lights, a radio, switches, electric motors, door locks and the like. A wiring harness provided to accomplish this is most conveniently routed within the relatively narrow space separating the interior surface of the passenger compartment (i.e., the interior of the headliner) and the external surface of the automobile. This restricts the diameter of and the number of wires contained in a bundled wiring harness.

Conventional bundled wiring harnesses are laborious and expensive to construct and do not lend themselves to automatic assembly and installation techniques, such as provided by robotics, increasing the time and expense required to mount a wiring harness on a support structure Also, such bundled wiring harnesses are not readily adapted for secure mounting on a support structure. Vibration or mechanical shock in the support structure is transmitted to the wiring harness and frequently generates undesirable noise, or damage to the wiring harness.

Flat profile wiring harnesses (such as ribbon cables) have been developed in the past in an attempt to overcome some of the limitations of conventional bundled wiring harnesses. U.S. Pat. No. 2,831,049 to Cabral discloses a wiring harness having a pair of wires mounted within a continuous resilient carrier. The bottom surface of the carrier includes an adhesive coating for securing the carrier to a support structure. However, Cabral exhibits several limitations. Specifically, it fails to provide for one or more branch cables diverted from the main cable. The carrier, although depicted as flexible, is inherently less flexible in the plane containing the wires, than the wires themselves, and thus the flexibility of the wiring harness is inhibited.

U.S. Pat. No. 4,210,773 to Haley et al. represents another attempt to overcome the limitations of conventional bundled wiring harnesses. That patent discloses a flat profile wiring harness constructed by arranging a plurality of wires in a desired pattern on a common flat plane and including at least one branch cable. A bonding agent is applied to wires which solidifies to form the wiring harness with the wires secured by the continuous bonding agent in a fixed spatial relationship within the common flat plane.

Although Haley et al allows for a wiring harness having a branch cable, it still suffers from several inherent deficiencies. The wiring harness completely lacks any means for mounting on a support structure. The process of applying a liquid bonding agent over the full length of the wiring harness is slow and expensive. Further, as in the Cabral patent, the flexibility of the wiring harness within the common flat plane containing the wires is 10 reduced by the solidified bonding agent. In both Cabral and Haley et al, identification of and access to individual wires at intermediate points on the wiring harness may be obstructed or prevented by the continuous carrier about the wires. Finally, if the support structure is a vehicle, the continuous carrier in Cabral or the coextensive bonding agent in Haley et al represents not only an undesirable expense, but undesirable additional weight as well.

U.S. Pat. No. 3,733,428, issued to Fry, discloses a flat profile wiring harness in which a row of wires are fused by their insulation to a thermoplastic backing strip. The backing strip may be continuous, or may be broken into a number of discrete segments fused to straight portions of the wiring harness. However, the wiring harness in Fry does not provide means for mounting the wiring harness on a support structure. And, the backing strip is secured to the wires only over a minor portion of the circumference of the wires.

SUMMARY OF THE INVENTION

This invention provides a wiring harness and support structure for conveying energy with respect to the support structure and comprises at least two wires arranged in a row. At least two spaced pads are molded about the wires intermediate the ends of the wires and extend generally transverse thereto. The wires are secured within the pads so that the pads longitudinally hold the wires and support the wires in a desired spatial relationship to each other. Means are provided to secure at least two of the pads to the support structure, so that the pads support and position the wires with respect to the support structure.

In addition, the pads may also provide for: identifying the wires; interconnecting of at least two wires within a pad; mounting an electric or electronic device within a pad connected to at least one wire; and connecting the wires to devices, such as lights, motors and switches. The wires may be flexible within and without a flat plane between the pads. The wiring harness may be readily mounted on a support structure manually or by using automatic assembly and installation techniques, such as robotics.

BRIEF DESCRIPTION OF THE DRAWINGS

FIG. 1 top view of a segment of a wiring harness

FIG. 2 is a cross-sectional view along plane 2—2 of FIG. 1.

FIG. 8 is a segment of a wiring harness according to this invention with a single row of wires transitioning within a pad to two parallel rows of wires.

FIG. 8A is a cross sectional view of FIG. 8 along plane 8A—8A.

FIG. 10 is an isometric view of one embodiment of means for mounting a pad on a support structure.

FIG. 11 is an isometric view of an alternative embodiment of the mounting means.

FIG. 12 is an isometric view of yet another alternative embodiment of the mounting means FIG. 12A is a side view, partially cross sectioned, of the pad and mounting means of FIG. 12 mounted on a support structure.

FIG. 14 is an exploded view of another alternative embodiment of the mounting means.

FIG. 21 is the segment of a wiring harness as in FIG. 20, with the segments rotated towards each other for conforming to a complementary surface of a support structure.

FIG. 22 is a segment of a wiring harness according to this invention with a pair of wires electrically interconnected within a pad.

FIG. 22A is a plan view of an electrically conductive contact for interconnecting wires within a pad as in FIG. 22.

FIG. 24 is a segment of wiring harness according to this with a switch for connection to the wiring harness through a receptacle molded into a pad.

FIG. 25 is a segment of a wiring harness according to this invention with a motor for connection to the wiring harness through a receptacle molded into a pad.

FIG. 26 is a segment of a wiring harness according to this invention with a light bulb for connection to the wiring harness through a receptacle molded into a pad.

FIG. 31A is a top view of a segment of a wiring harness according to this invention with the length of wires between a pair of adjacent pads incrementally increased across the row.

FIG. 31B is a top view of the segment of a wiring harness of FIG. 31A with the wires in the row bent about a common center of curvature within a common flat plane.

FIG. 33 is a segment of a wiring harness according to this invention with a pair of pads mounted to a support structure and with an intermediate unsecured pad.

DETAILED DESCRIPTION OF THE INVENTION

Figure 13:
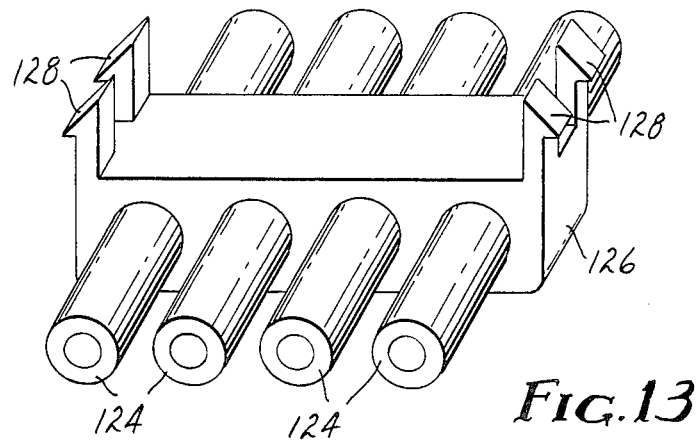
FIG. 13 is an isometric view of yet another alternative embodiment of the mounting means.

Referring now to FIG. 1, the reference 10 generally indicates a segment of a wiring harness constructed according to this invention. The wiring harness 10 includes wires 12, 14, 16, 18 and 20. For purposes of this invention, the term "wire" includes any elongate conductor for conveying energy, and includes electrically conductive insulated metallic wires, including single or multi-strand conductors, coaxial cables and twisted pair conductors, for transmitting energy in the form of electrical current, as well as jacketed optical fibers for transmitting energy in the form of light signals. The wires 12, 14, 16, 18, and 20 may vary in type, size, length and relative spacing along the length of the wiring harness.

The row of wires extends through at least two spaced pads 22 and 24 intermediate the ends of the wires Additional pads (not shown) may be molded about the ends of one or more of the wires as will be explained in greater detail hereinafter. As is also shown in FIG. 2, the pads each comprise a body molded completely about the wires so as to secure the wires within the body. For the purposes of this invention, the term "molded" refers to any solid body formed from a quantity of liquid or flowable material applied about the wires at a desired location on the wiring harness. The pads extend generally transverse to the row of wires, and have sufficient length, width and thickness to longitudinally hold and support the wires in a desired spatial relationship to each other. Although the pads are shown having a generally rectangular form, they may be molded in any desire size or shape. Preferably, the pads are made of an easily molded thermoplastic material, such as polypropylene, acrylonitrile butadiene styreme (ABS) or a polyamide. If any electrical connection is made within a pad, it is also preferred that the pad be made of an electrically insulating material.

In many wiring harnesses the row of wires is longitudinally partitioned (as at 28) at one or more points intermediate the ends of the wires. In the embodiment illustrated in FIG. 1, the row of wires is divided into a main cable 30 and a branch cable 32. Each branch cable may contain one or more wires. In the illustrated embodiment, the main cable 30 on one side of point 28 includes wires 12, 14, 16 and branch cable 32 includes wires 18 and 20. The wires of main cable 30 extend to at least one additional pad 36 separate from the wires of the branch cable. In the illustrated embodiment, the wires of the main cable also extend to additional pad 38 and the wires of the branch cable 32 extend separately to pad 40.

Although not shown in FIG. 1, additional branch cables may be longitudinally partitioned from the main cable at other points along the length of the wiring harness. Further, the various branch cables may in turn be divided and subdivided as desired to form additional branch cables or they may be combined with the main or another branch cable at another point along the length of the wiring harness A branch cable may be formed from any combination of wires within the row of wires, including non-adjacent wires and wires from the middle of the row of wires. Additional wires or cables may be incorporated into the wiring harness at any point and may extend from one cable to one or more other cables.

Figure 3:
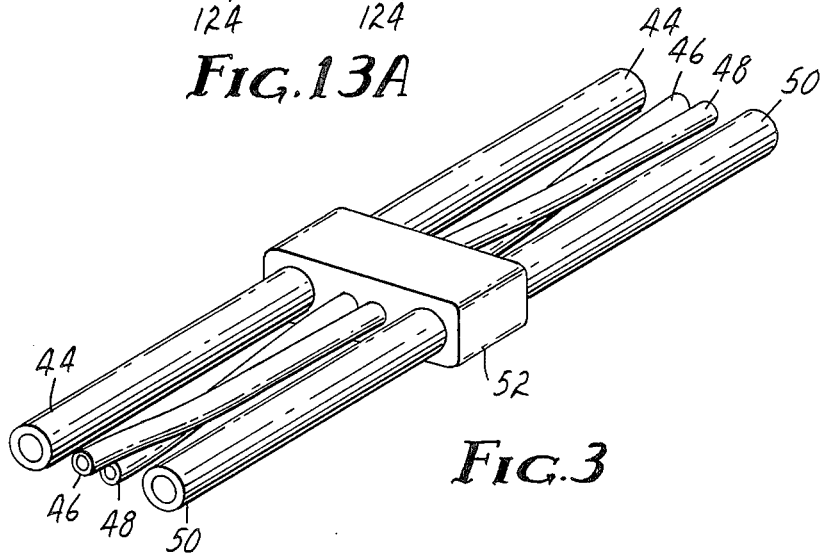
FIG. 3 is a segment of wiring harness according to this invention with a row of wires including a twisted pair of wires between a pair of parallel wires extending through a pad.
Figure 18A:
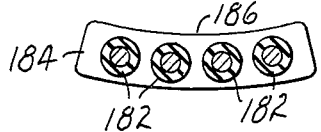
FIG. 18A is a cross sectional view of FIG. 18 along plane 18A—18A.

The row of wires may include as few as two wires, or as many as required to form the desired wiring harness. For the purposes of this invention, the term "row" as applied to the wires includes any sequential, laterally spaced array of generally longitudinally parallel wires. As illustrated in FIG. 2, the row of wires at any given point may lie within a common flat plane 42. However, the row of wires may also be laterally spaced in a curvilinear formation, such as shown in FIG. 18A. The wires may be arranged in any desired sequential pattern, as defined by a series of intersecting planes defined between each adjacent pair of wires. FIG. 3 shows a segment of a wiring harness having wires 44, 46, 48 and 50 extending through pad 52. Wires 46 and 48 are mutually intertwined to form a twisted pair, as is sometimes found advantageous in a wiring harness. Wires 44, 46, 48 and 50 are still generally arranged in a row within the meaning of this invention.

Figure 4:
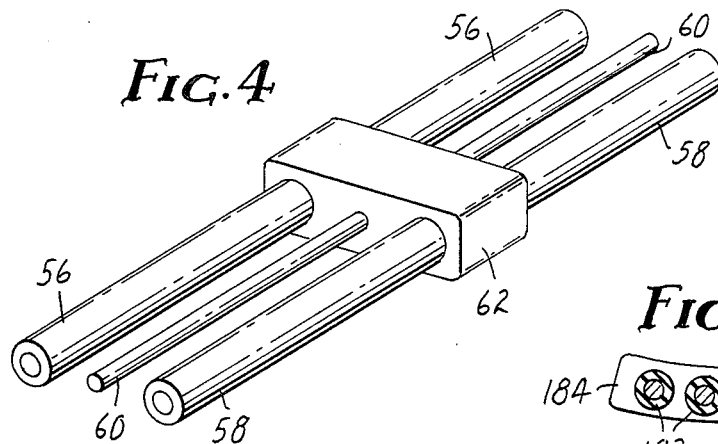
FIG. 4 is a segment of a wiring harness according to this invention with a row of wires including an optical fiber.

FIG. 4 shows a segment of wiring harness having a row of wires including electrically conductive wires 56 and 58 on either side of an optical fiber 60 extending through pad 62. In this embodiment, the wires 56 and 58 may be used to transmit energy in the form of electrical current to remote devices such as motors, lights or the like. The optical fiber 60 may be used to transmit energy in the form of light signals to or from a remote device such as for control or monitoring purposes.

Figure 5:
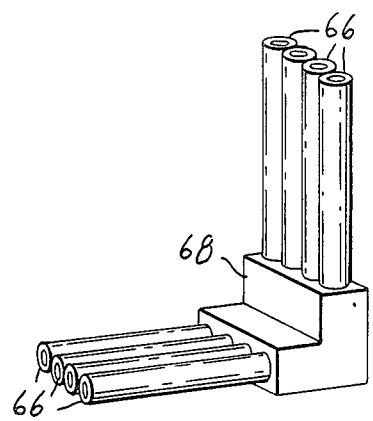
FIG. 5 is a segment of a wiring harness according to this invention with a row of wires bent within a pad 90° out plane of the incoming wires
Figure 6:
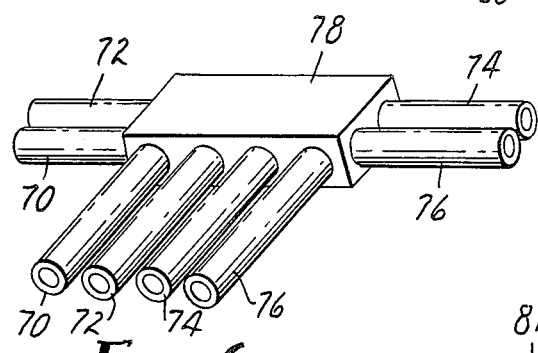
FIG. 6 is a segment of a wiring harness according to this a row of wires bent 90° within a pad in the plane of the incoming wires.
Figure 7:
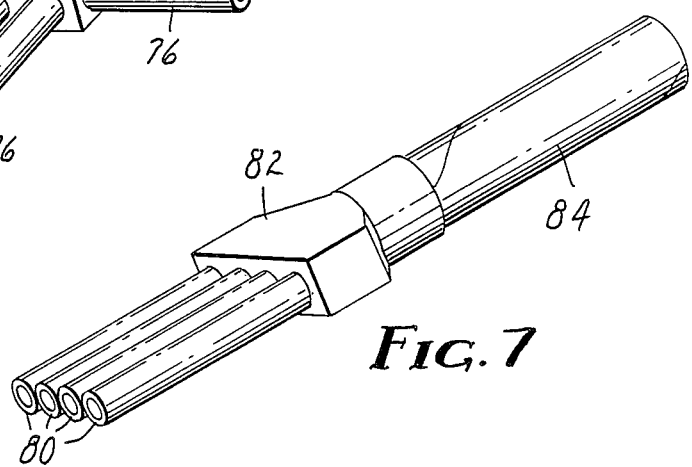
FIG. 7 is a segment of a wiring harness according to this invention with a row of wires transitioning within pad to a bundled wiring harness configuration.

The pads are not limited to holding and supporting the wires in a fixed, parallel relationship. The wires may be bent within a pad so that the row assumes a different configuration at different locations in the pad. Further, the wires may be bent, and the shape and size of the pad adjusted so that the location of the wires relative to the exterior of the pad is changed FIG. 5 illustrates a segment of wiring harness having a row of wires 66 extending through a pad 68. Within the pad 68, the row of wires is bent 90° so as to emerge from the pad in a direction perpendicular to the position of the row of wires entering the pad. FIG. 6 shows a segment of a wiring harness having a row of wires 70, 72, 74 and 76 extending into pad 78. The wires are bent 90° within the pad 78 so that wires 70 and 72 emerge from pad 78 in a first transverse direction, and wires 74 and 76 emerge from pad 78 in an opposite transverse direction, so as to form a "T" bend in the wiring harness. FIG. 7 shows a segment of a wiring harness having a row of wires 80 extending into pad 82. The wires 80 are bent within pad 82 so as to emerge in the form of a segment of a conventional bundled wiring harness 84. FIG. 8 shows a segment of wiring harness having a row of wires 86 extending through a pad 88. The row of wires is bent within the pad, and as shown in FIG. 8A emerges in two parallel rows of wires. The row of wires may also be bent within a pad to alter the order of the wires within the row. That is, a wire on an edge of the row of wires may, for example, be bent within a pad so as to emerge from the pad in an intermediate position within the row of wires.

Figure 9:
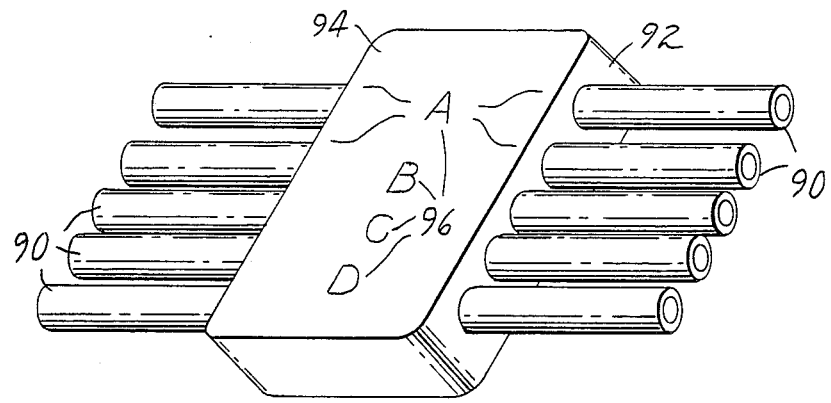
FIG. 9 is a segment of a wiring harness according to this invention with a pad having indicia for identifying the wires.

It is a further major advantage of this invention that the pads holding and supporting the wires may incorporate one or more additional features For example, in FIG. 9, a segment of a wiring harness is shown having a row of wires 90 extending through pad 92. Pad 92 includes surface 94 which includes indicia 96 The indicia 96 may be imprinted upon the surface 94 of the pad or preferably integrally formed during the molding of the pad about the wires. The indicia may provide any useful information, such as the identity of the individual wires or the wiring harness as a whole. Identification of the wires is easily and quickly accomplished, and unobstructed access to the wires is provided intermediate the pads.

Means are provided to secure and mount at least two of the pads of the wiring harness on a support structure. The mounting means is provided to securely mount the wiring harness to the support structure and to support and position the various wires in relation to the support structure. Utilizing the molded pads to mount the harness permits precise location of the mounting means to facilitate the use of robotics in mounting the harness on the support structure.

In FIG. 10 a segment of wiring harness is shown having a row of wires 100 extending through pad 102. The mounting means comprises an adhesive layer 104 deposited on a surface of the pad. A release liner 106 may be applied over the adhesive layer to protect the adhesive prior to use and, in use, it is removed so that the adhesive layer is exposed and may be applied to a support structure (not shown) for mounting the pad thereto.

In FIG. 11, a segment of wiring harness is shown having a row of wires 108 extending through pad 110. A resilient clip 112, preferably integrally molded with the pad, projects from one surface of the pad for resiliently engaging a portion of a support structure (not shown) so as to mount the pad thereto. This embodiment enables the pad to be easily and quickly detached from or repositioned while remaining secured to the support structure, if desired.

FIG. 12 shows a segment of a wiring harness having a row of wires 114 extending through a pad 116. A barbed stud 118 projects from the pad and is preferably integrally formed therewith. As is shown in FIG. 12A, the barbed stud 118 may be used to mount the pad to support structure 120 by forcibly inserting it through opening 122 through the support structure. Such openings may be preformed at a desired location in a support structure.

Figure 13A:
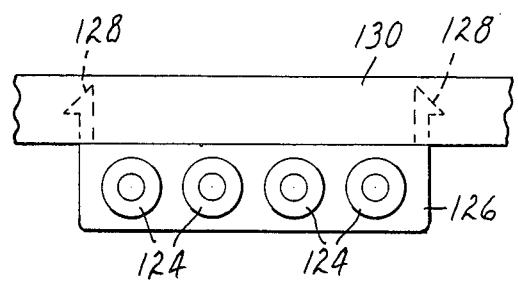
FIG. 13A is a side view of the pad and mounting means of FIG. 13 mounted on the support structure.

FIG. 13 shows a segment of a wiring harness having a row of wires 124 extending through pad 126. The mounting means takes the form of one or more barbed prongs 128 preferably integrally formed with the pad. As is shown in FIG. 13A, the pad may be mounted to support structure 130, constructed of a penetrable material such as a foamed thermoplastic, by forcing the barbed prongs into the support structure. The barbed prongs 128 are useful in mounting a pad to the headliner frequently found in vehicles.

FIG. 14 shows a segment of a wiring harness having a row of wires 134 extending through pad 136. The mounting means takes the form of lead 138 projecting from a surface of a mounting pad and including aperture 140. A screw, bolt, rivet or the like 142 is provided for insertion through aperture 140 and engaging hole 144 in support structure 146 so as to secure the pad 136 to the support structure. The lead 138 is constructed of electrically conductive material and connected within the pad to one of the wires 134. The lead 138 is electrically connected to the wire by soldering, crimping or an insulation displacement contact (IDC) as hereinafter explained in greater detail. The lead provides a grounding path for the wire. In the case of a vehicle, it is common to utilize the conductive metal frame or body of the vehicle as a grounding path to complete a circuit, thereby eliminating a separate grounding wire to each location for that purpose.

Figure 15:
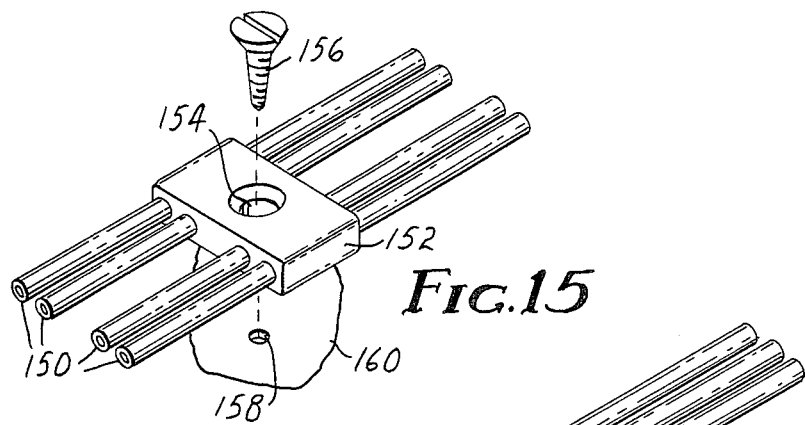
FIG. 15 is an exploded isometric view of yet another alternative embodiment of the mounting means.

FIG. 15 shows a segment of a wiring harness having a row of wires 150 extending through a pad 152. An aperture 154 extends transversely through the pad. A screw, bolt, rivet or the like 156 is provided for insertion through aperture 154 and engages hole 158 in support structure 160 so as to secure the pad to the support structure. As in the segment of a wiring harness shown in FIG. 14, screw 156 can be conductive and electrically connected to a wire within the pad when inserted into aperture 154 to establish a conductive path from the wire to the support structure.

Figure 16:
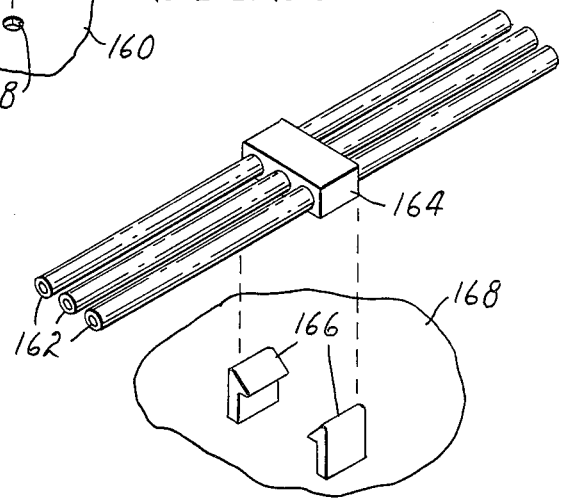
FIG. 16 is an exploded isometric view of another alternative embodiment of the mounting means.
Figure 17:
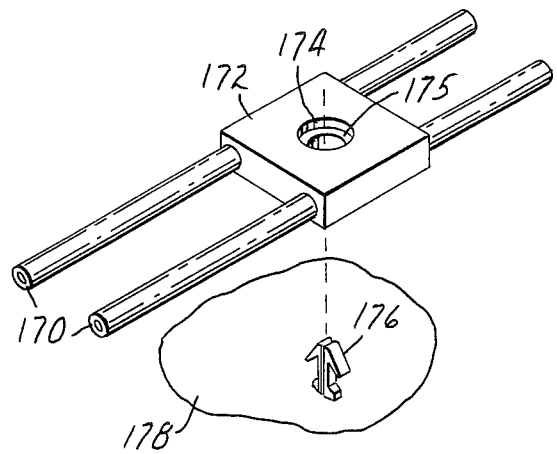
FIG. 17 is an exploded isometric view of yet another alternative embodiment of the mounting means.

In some applications, such as interior trim panels in automobiles it is desirable to avoid holes in the support structure for mounting a pad. The mounting means may thus include members projecting from a support structure for engaging a pad. In FIG. 16, a segment of wiring harness is shown having a row of wires 162 extending through pad 164. A pair of facing clips 166 project from support structure 168 and are arranged so as to resiliently engage pad 164 when the pad is positioned adjacent the support structure, as illustrated in FIG. 16, and pressed down between the clips 166 until the facing projection of the clips snap over the top surface of the pad. FIG. 17 shows a segment of a wiring harness having a row of wires 170 extending through pad 172. The pad 172 has a mounting aperture 174 extending through it with a shelf 175. Clip 176 projects from support structure 178, such that the pad may be positioned adjacent support structure 178 as illustrated in FIG. 17, and pressed down until the clip 176 is inserted into aperture 174 and its outwardly facing projections snap over the shelf 175 of the aperture 174 to secure the pad to the support structure with the clip recessed within the aperture Although not shown, the mounting means includes providing a pad having a size and shape suitable for insertion of the entire pad into a cooperative aperture or cavity formed in a support structure and frictional engagement therewithin.

Figure 18:
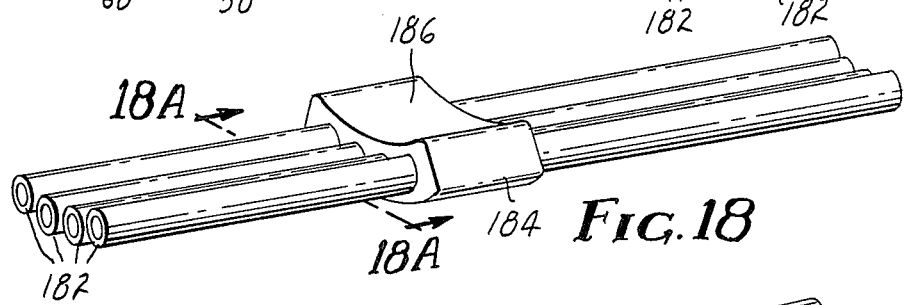
FIG. 18 is a segment of wiring harness according to this invention with a pad having an arcuate surface for conforming to a complementary surface of a support structure.

In FIG. 18, a segment of wiring harness according to this invention is shown having a row of wires 182 extending through pad 184. Pad 184 includes arcuate surface 186 provided to conform to a complementary surface of a support structure (not shown) and it may utilize any of the mounting means previously discussed. The arcuate surface 186 enables the pad 184 to be positioned more securely to the support structure by conforming more closely to the contours of the support structure. As shown in FIG. 18A, the row of wires 182 are preferably arranged in an arcuate configuration as opposed to the flat common plane shown in FIG. 2, concentric with respect to surface 186 so as to reduce the thickness of pad 184.

Figure 19:
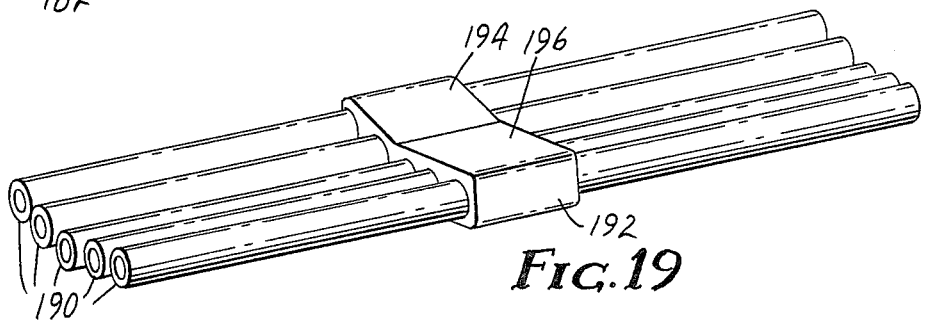
FIG. 19 is a segment of wiring harness according to this invention with a pad having a bi-planar surface for conforming to a complementary surface of a support structure.

In FIG. 19, a segment of a wiring harness is shown having a plurality of wires 190 extending through pad 192. Pad 192 has a surface including two intersecting planes 194 and 196 provided for conforming to a complementary surface of a support structure (not shown) and may utilize the mounting means previously discussed.

Figure 20:
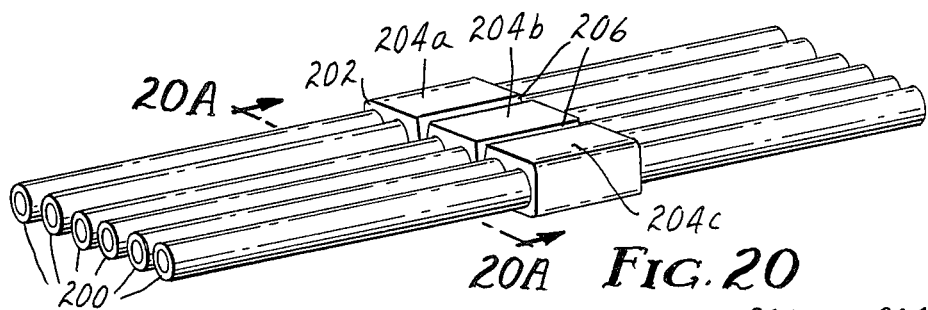
FIG. 20 is a segment of a wiring harness according to this invention with a pad longitudinally divided into three flexibly connected segments.
Figure 20A:
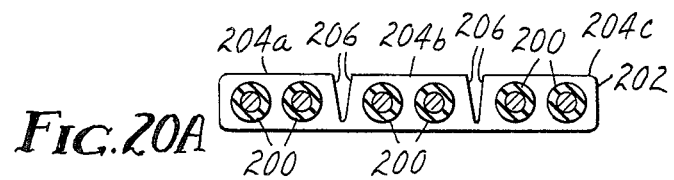
FIG. 20A is cross section of FIG. 20 along plane 20A—20A.

FIG. 20 shows a row of wires 200 extending through pad 202. As is also shown in FIG. 20a, pad 202 is divided into two or more flexibly connected segments which as illustrated include segments 204a, 204b and 204c. The opposing surfaces 206 between segments 204a and 204b; and 204b and 204c, respectively, are mutually inclined. As is shown in FIG. 21, this enables the segments (and the wires) to be independently rotated towards each other until the opposing surfaces 206 are in contact. The pad is thus adapted to conform to a complementary surface on a support structure (not shown).

Any of the pads may incorporate a surface of any size, shape or configuration conforming to the contour at a desired location on a support structure. In conjunction with the mounting means and pad constructions as herein described, a wiring harness may be easily and quickly mounted on a support structure using manual or automatic assembly and installation techniques.

A pad may incorporate means for interconnecting within a pad at least two wires extending through or into a pad for conveying energy between the wires. FIG. 22 shows a segment of a wiring harness having wires 210 and 212, respectively, extending through pad 214. A third wire 216 extends into pad 214 and terminates therein. Electrically conductive contact 218 is molded into pad 214 and is in simultaneous electrical contact with wires 216 and 212 within the pad. Any electrically conductive member may be utilized to interconnect the wires and may be connected to each wire by soldering, crimping or any other equivalent method. In the illustrated embodiment, contact 218 is an insulation displacement contact (IDC) (also shown in FIG. 22A) and includes a pair of wire receiving slots 219 within which wires 212 and 216 are inserted U.S. Pat. Nos. 3,388,370, issued to Elm and 4,124,265 issued to Turk, both of which are incorporated herein by reference, disclose IDC type contacts as herein discussed. The electrically conductive contact 218 thus interconnects wires 212 and 216 within the pad 214.

Figure 23:
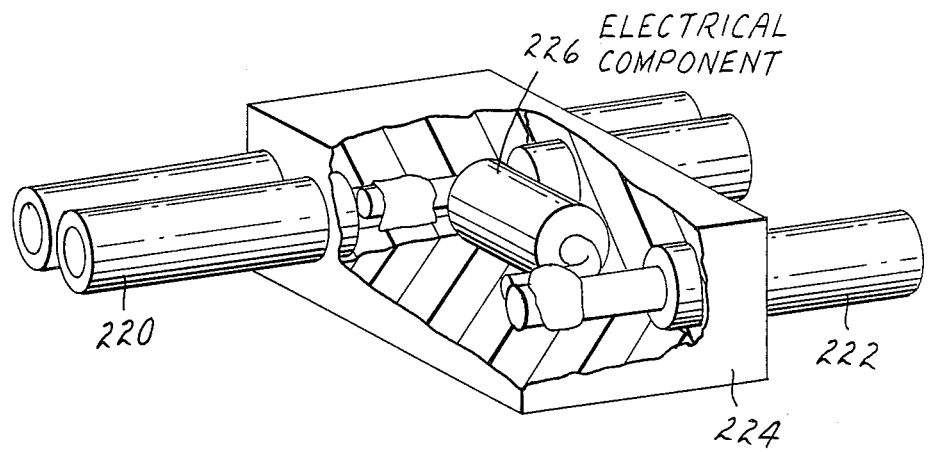
FIG. 23 is a segment of a wiring harness according to this invention with a pair of wires electrically interconnected within the pad through an electrical device.

As shown in FIG. 23, the means for interconnecting wires 220 and 222 within a pad 224 may also include an electrical device 226 having leads electrically connected such as by soldering (as shown), crimping or any other known method, to at least two wires within the pad, in place of the electrical contact as in FIG. 22. The electrical device may comprise passive devices such as diodes, resistors, and capacitors or active devices such as transistors, integrated circuits, and printed circuit boards having one or more such devices mounted thereon The pad, constructed of electrically insulating material, provides a housing for the devices molded within the pad. For example, a switch may be molded within a pad to interconnect a pair of wires within the pad and the pad constructed from a deformable material, enabling the switch to be actuated externally of the pad by compressing the pad about the switch. The pad also protects the wires, devices and electrical connections within the pad from adverse environmental conditions.

A pad may include means for connecting one or more of the wires extending through or into a pad to various external devices such as electric or electronic components, printed circuit boards or other wiring harnesses for conveying energy to and from the wires. The connection means may take the form of conventional electrical connectors secured to the ends of one or more of the wires forming part of the wiring harness in a manner known to the art. Alternatively, connectors may take the form of pads with contacts molded into the pads and in electrical contact with one or more of the wires extending into or through a pad, such as is shown in U.S. Pat. No. 4,030,799, issued to Venaleck, the contents of which are incorporated herein by reference. The pads may form male or female connectors, with the contacts of each being accessible externally of the pad.

As shown in FIG. 24, the connection means may include a receptacle or female connector 230 formed in a pad 232 through which wires 234 and 236 extend. Receptacle 230 includes a pair of cavities 238 extending into pad 232. A pair of electrically conductive contacts 240 (only one of which is shown) are molded into the pad in electrical contact at longitudinally spaced points, along wire 236, and on either side of a discontinuity (as at 242) in the wire. Each of the contacts 240 extends into one of the cavities 238. Blade terminals 244 of switch 246 are each received within one of the cavities 238 so as to be in electrical contact with one of the contacts 240. The switch is retained within the receptacle through frictional contact between the blade terminals 244 and the contacts 240 within the receptacle. The switch extends across the discontinuity 242 in the wire 236 and enables the wire to be electrically connected across the discontinuity when the switch is shifted to an "on" position. The cavities of the receptacle may be filled with a quantity of grease or like substance to protect the contacts from corrosion and to protect the connection between the contacts and blade terminals when a device, such as the switch, is engaged with the receptacle.

FIG. 25 shows a segment of a wiring harness having a pad 250 into which a row of wires 252 extends. Receptacle or female connector 254 is formed in pad 250 and includes a pair of cavities 256. Although not shown, a pair of contacts, such as were discussed in regard to FIG. 24, are molded into the pad each in electrical contact with one of the wires 252 and each extending into one of the cavities 256. Motor 258 is provided with a pair of blade terminals 260 which may be aligned with and received within the cavities for electrical connection to the wires. The motor is energized through the wires 252 connected to a remote source of electrical energy. Usually motor 258 is mounted on a support structure (not shown) by conventional methods. The pad 250 is secured to the motor through frictional engagement between the blade terminals of the motor and the contacts within the cavities, so as to mount the pad to support structure through the motor. Additional structure (not shown) may be provided to more securely attach the pad to the motor.

FIG. 26 shows a segment of a wiring harness having a pad 262 through which a row of wires 264 extends. Receptacle or female connector 266 is formed in the pad and includes cavity 268. Although not shown, a pair of electrically conductive contacts such as were discussed in respect to FIGS. 24 and 25 are mounted within the pad, each electrically connected to one of the wires 264 and extending into the cavity 268. Light bulb 270 is provided for insertion into the receptacle and includes a pair of spaced metallic contacts 272 for electrical connection to the contacts within the receptacle to energize the light bulb from a remote source of electrical energy (not shown). Although not shown, pad 262 may incorporate an integral reflector projecting about receptacle 266 and provided with a reflective surface to enhance the effectiveness of the light bulb 270. Frequently, a lens (not shown) will be incorporated into a support structure for use with a light bulb as in FIG. 26. The pad 262 may be mounted on the support structure in a manner previously described at a predetermined position with respect to the lens.

Figure 27:
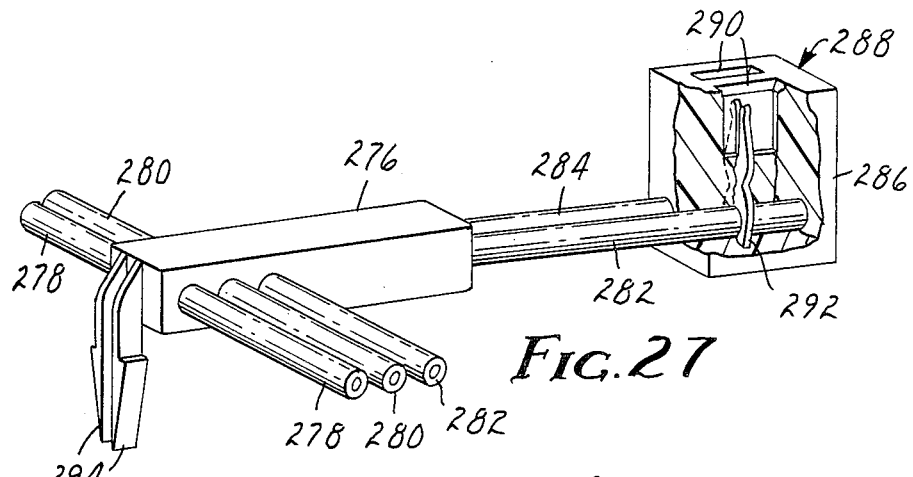
FIG. 27 is a segment of a wiring harness according to this invention with a pad molded about the ends of a pair of wires and a receptacle molded in the pad.

In FIG. 27, a segment of a wiring harness is shown including a pad 276 and wires 278, 280, and 282 extending into pad 276. Wires 278 and 280 extend through the pad whereas wire 282 is bent within the pad and emerges in a perpendicular direction. Wire 284 is provided which extends into pad 276 and is electrically interconnected therewithin to wire 280 as previously described. Wires 282 and 284 extend into pad 286 molded about the ends of the wires. Receptacle or female connector 288 is formed in pad 286. Receptacle 288 includes a pair of cavities 290, each of which includes a contact 292 (only one of which is shown) connected within pad 286 to one of the wires 282 and 284. Each of the contacts 292 is provided for sliding receipt within a cavity 290 and electrical connection with a blade type terminal (not shown) of an electrical device (not shown). Pad 276 further includes one or more barbed studs 294 projecting therefrom. The studs 294 are grouped into a pair such that the pair of barbed studs may be inserted into an aligned aperture (not shown) in a support structure (not shown) for securing the pad to the support structure. This represents yet another alternative embodiment of the mounting means previously described.

Figure 28:
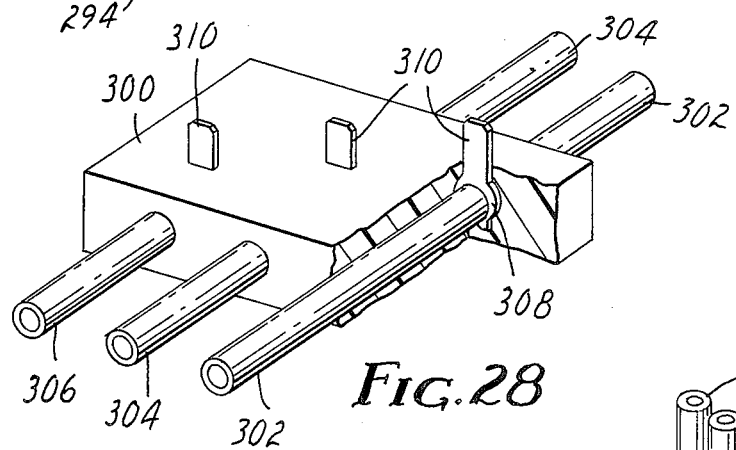
FIG. 28 is a segment of a wiring harness according to this invention with electrically conductive contacts molded into and connected to wires within a pad with male tabs projecting externally of the pad.

In FIG. 28, a segment of wiring harness is shown having a pad 300 into which a row of wires 302, 304 and 306 extends. Electrically conductive contacts 308 are mounted within the pad, each in electrical contact with one of the wires 302, 304, and 306. Each of the contacts includes a blade type tab 310 extending externally of the pad forming a male connector intermediate the ends of wires 302 and 304 for electrical connection of the wires with the other electrical devices or harnesses externally of the pad. Wires 302 and 304 extend through the pad whereas wire 306 terminates within the pad. It is to be understood that all of the wires 302, 304 and 306 may be formed so as to terminate within the pad, if desired.

Figure 29:
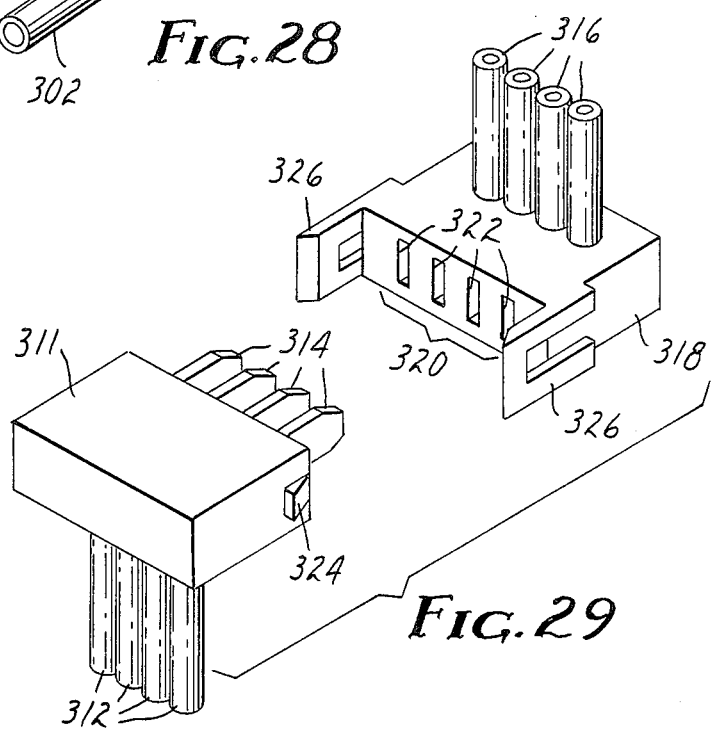
FIG. 29 is a segment of one wiring harness terminating in a pad having a female connector and an aligned male connector formed in a pad on the end of another wiring harness.

FIG. 29 shows segments of two wiring harnesses, each terminating in a pad. Pad 311 includes a row of wires 312 extending into it. Each of the wires is connected within the pad to an electrically conductive contact 314 molded into the pad and with a blade type tab extending externally of the pad as shown to form a male connector. A second row of wires 316 extends into pad 318. A receptacle of female connector 320 is formed in pad 318 and includes a plurality of cavities 322. Electrically conductive contacts (not shown) are mounted within pad 318 each extending into one of the cavities 322 and each in electrical contact with one of the wires 316. Thus, each of the protruding tabs of contacts 314 are telescopically received within one of the aligned cavities 322 as the pads 311 and 318 are brought together. Electrical interconnection is established by the respective contacts between the wires 312 and 316 of the respective wiring harnesses. Cooperative latching members 324 (only one of which is shown ) and 326 are formed on each of the pads 311 and 318 to releasably secure the pads together.

Although FIGS. 22 through 29 relate to the connection or interconnection of electrically conductive wires, means may also be provided as part of this invention to interconnect optical fibers within a pad and to connect an optical fiber externally of a pad to convey energy in the form of light signals to and from the optical fibers. U.S. Pat. No. 4,470,180 issued Sept. 11, 1984, and entitled "Device for Restraining An Object or Objects Therein" discloses one arrangement for effecting connection between optical fibers for transmitting energy therebetween, and is incorporated herein by reference.

Figure 30:
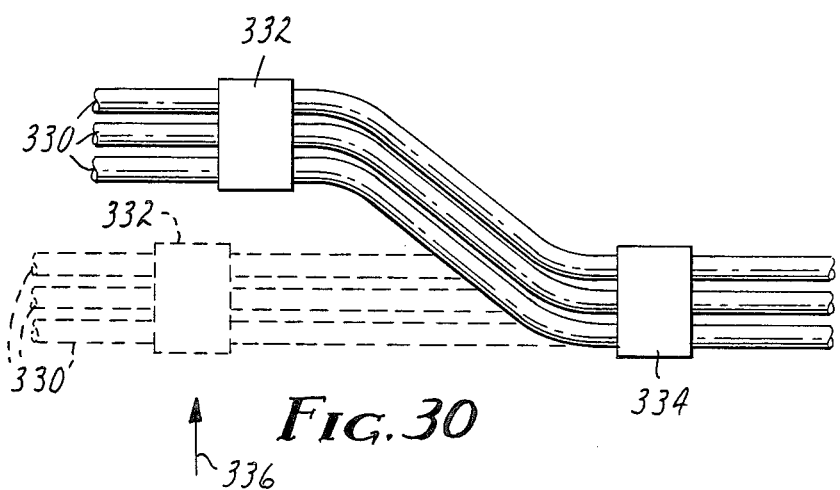
FIG. 30 is a top view of a segment of a wiring harness according to this invention with one pad laterally displaced from another pad within a common flat plane.

It is another feature and advantage of this invention that the row of wires is flexible within and out of a common flat plane intermediate the pads. FIG. 30 shows a segment of a wiring harness with a row of wires 330 extending through and between pads 332 and 334. Pad 332 has been laterally translated in direction 336 with respect to pad 334. Since the wires 330 are spaced from each other and not directly connected, the flexibility of the wiring harness is not inhibited within a common flat plane defined by the row of wires, as in the case of conventional flat profile cales.

In FIG. 31A, a segment of wiring harness is shown having wires 338, 340, 342 and 344 extending through and between pads 346 and 348. It is desired to incorporate a bend in the wiring harness intermediate the pads 346 and 348. Therefore, as the pads are molded about the wires, the length of wire 340 between the pads 346 and 348 is incrementally increased compared to the length of wire 338. Likewise, the length of wire 342 is incrementally increased over wire 340 between the pads, and length of wire 344 is incrementally increased over the length of wire 342 between the pads. After the pads are formed, the wiring harness may be easily bent within a common flat plane as shown in FIG. 31B, so that pad 346 is rotated in direction 350 with respect to pad 348. The wires 338, 340, 342 and 344 all have a common center of curvature 352 with incrementally increasing radii that maintain the lateral spacing of the wires between the pads 346 and 348. This minimizes the stress in the wires in the bent position. As added protection to the wires, pads 346 and 348 may incorporate a plurality of strain relief fingers 354, preferably integrally formed with the pads and projecting adjacent the wires for mechanical support of the wires in the bent position.

Figure 32A:
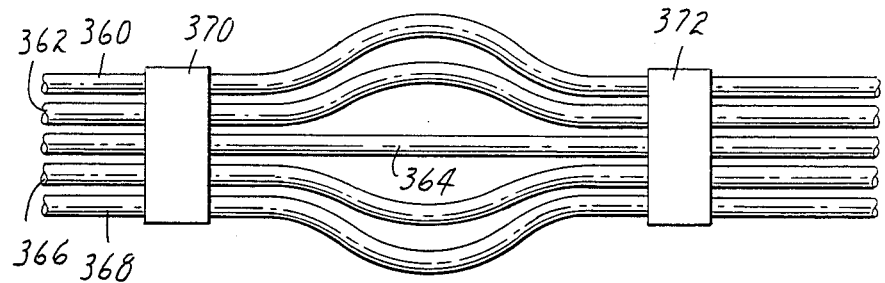
FIG. 32A is top view of another segment of a wiring harness according to this invention with the length of wires between a pair of adjacent pads incrementally increased on either side of a center wire.
Figure 32B:
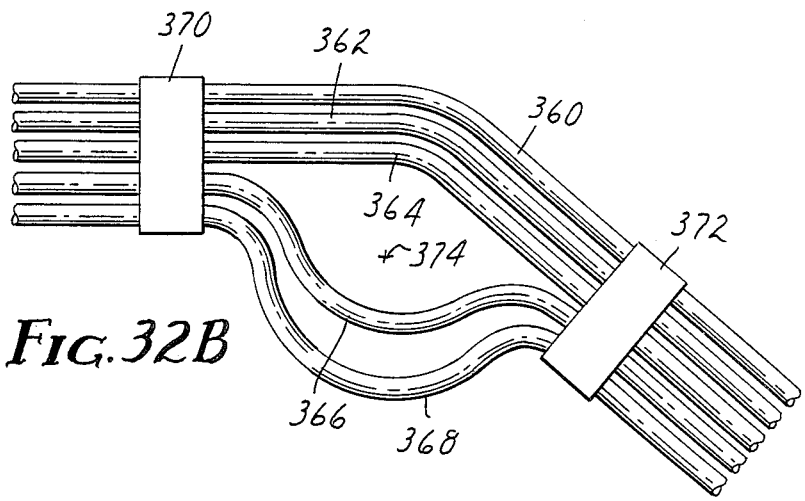
FIG. 32B is a top view of a segment of a wiring harness of FIG. 32A with a portion of the row of wires bent to one side about a common center of curvature within a common flat plane

In FIG. 32A, a segment of wiring harness is shown having wires 360, 362, 364, 366, and 368 extending through and between pads 370 and 372. It is desired to incorporate a bend in the wiring harness intermediate the pads 370 and 372, as in FIGS. 31A and 31B. However, it is also desired that the wiring harness be capable of bending in either direction within a flat common plane. Therefore, as the pads are molded about the wires, the length of wire 362 between the pads is incrementally increased compared to the length of wire 364. Likewise, the length of wire 360 is incrementally increased over wire 362 between the pads. Similarly, the length of wire 366 is increased over the length of wire 364, and the length of wire 368 is increased over the length of wire 366. Wire 364 maintains the shortest length between the pads After the pads are formed, the wiring harness may be easily bent within a common flat plane as shown in FIG. 32B, so that pad 372 is rotated in direction 374 with respect to pad 370. The wires 360, 362, and 364 on the outside of the bend all have a common center of curvature 376 with incrementally increasing radii that maintain the lateral spacing of the wires between the pads 370 and 372. The wires 366 and 368 on the inside of the bend are easily bowed outward to accommodate the bend of the wires from the position shown in FIG. 32A. This reduces the stress in the wires in the bent position. The segment of the wiring harness may be easily bent in an opposite rotational direction, if desired.

FIG. 33 illustrates a segment of a wiring harness having a row of wires 380 extending through pads 382, 384, and 386. Pads 382 and 386 are mounted on a support structure (not shown), such as by barbed studs 388. Pad 384 is not secured to the support structure, such that the position of pad 384 may be adjusted in both directions 390 and 392 or perpendicular to both directions, as well as rotated in direction 394 facilitated by the flexible length of the wires intermediate pad 382 and 386, until a desired position is achieved. Alternatively, mounting means may be provided for pad 384 that loosely secures the pad to a support structure, yet affords the pad movement within a restricted range in one or more of the directions discussed above. For instance, a barbed stud similar to that shown in FIGS. 12 and 12A may be inserted into an enlarged hole or elongate slot in a support structure, enabling the pad limited freedom of movement with respect to the support structure. This arrangement is particularly useful if an electrical device mounted on another support structure (not shown) is to be connected to the wiring harness, as hereinafter described. The adjustability of the position of pad 384 enables it to accommodate larger tolerances during connection.

For instance, in a vehicle, a wiring harness may be mounted on the inside surface of a door panel (not shown) or the like. An interior trim panel (not shown) is to be mounted on the door panel to enclose the wiring harness and includes an electric window switch, a radio speaker or the like. The electrical device is to be connected to one of the pads of the wiring harness as previously described, such as for supplying electrical power, control signals or the like. As the interior trim panel is mounted on the door panel, conductive terminals on the electrical device are inserted into a receptacle 396 built into pad 384. Cooperative guiding structures (not shown) may be built into the pad and electrical device (or interior trim panel) to shift the pad into alignment with the electric device for interconnection therewith.

Figure 34A:
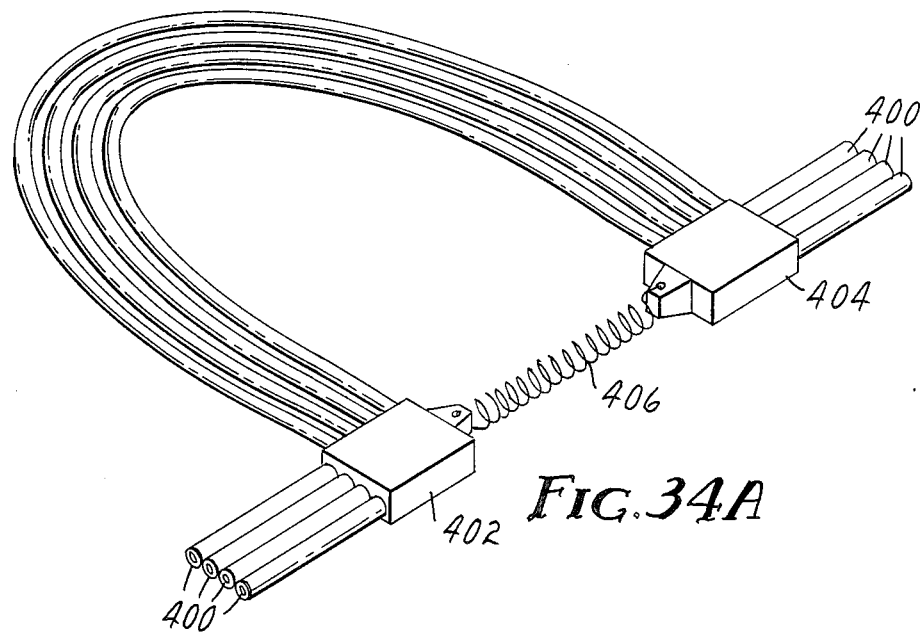
FIG. 34A is a segment of a wiring harness according to this invention with a pair of pads resiliently urged together by spring.

In FIG. 34A, a segment of wiring harness is shown having a row of wires 400 extending through spaced ads 402 and 404. The pads 402 and 404 are mutually interconnected by a resilient spring 406 so as to urge the pads towards each other. This arrangement allows the wires or pads to be grasped and pulled in opposite directions 408 and 410 as in FIG. 34B so as to separate the pads, yet enables the pads to automatically return to a relaxed position as in 34A upon release, with the wires remaining within a common plane at all times.

Figure 34B:
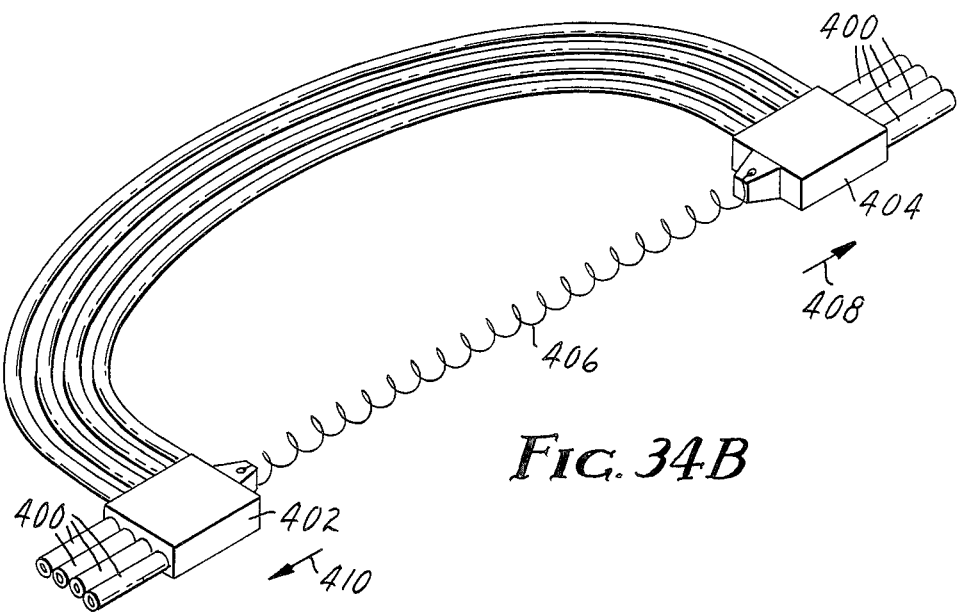
FIG. 34B is the segment of the wiring harness of FIG. 34A with the pair of pads moved further apart.
Figure 35B:
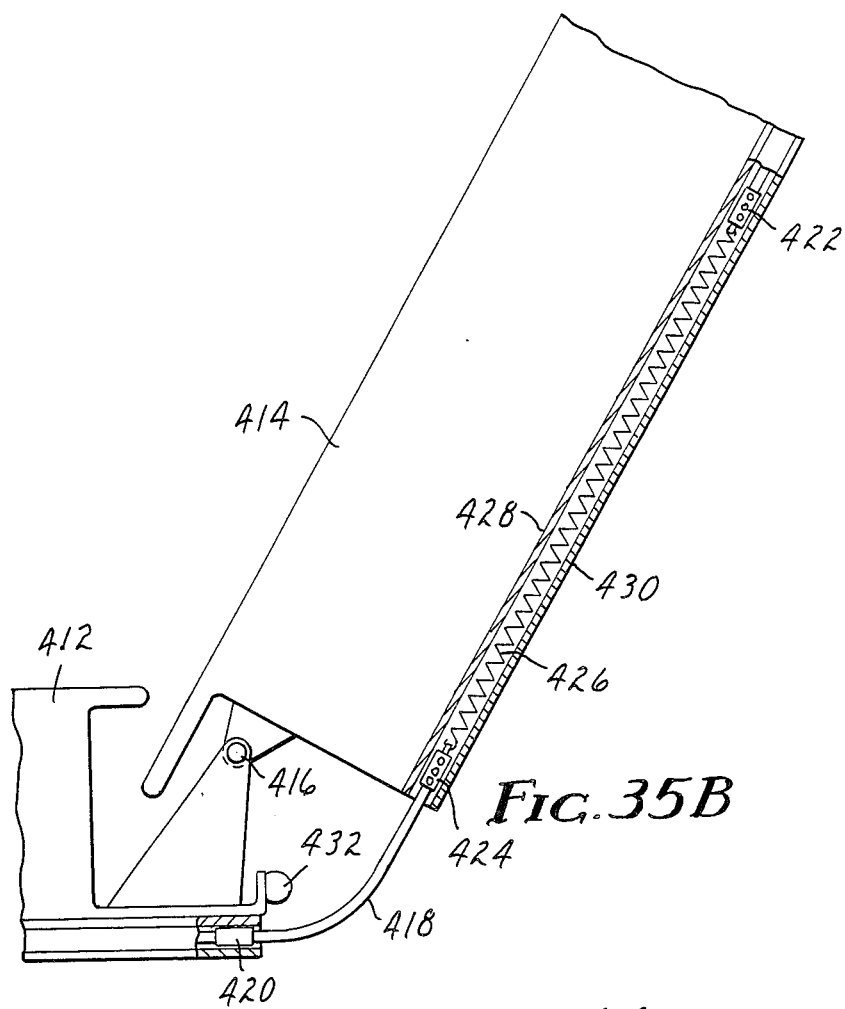
FIG. 35B is a cross sectional view of the vehicle of FIG. 35A with the door in an open position.
Figure 35A:
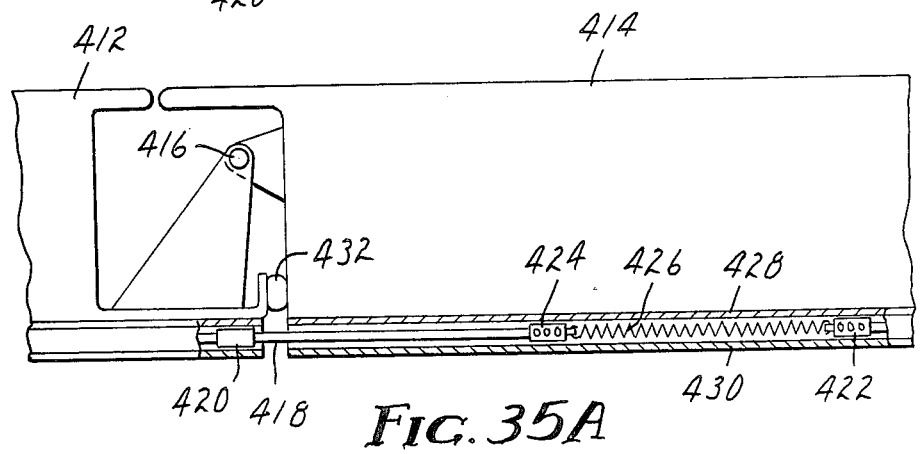
FIG. 35A is a cross sectional view of a vehicle with a segment of a wiring harness as in FIG. 34A mounted on a vehicle and a hinged door in a closed position.

The desirability of the segment of the wiring harness as shown in FIGS. 34A and 34B is evident when the support structure includes two or more portions that are movable with respect to each other. In regard to vehicles, this is shown in FIG. 35A, with vehicle body 412 connected by hinge 416 to vehicle door 414. A segment 418 of a wiring harness (seen edge on) includes pads 420 and 422. Pad 420 is mounted on the vehicle body 412 and pad 422 is mounted on the vehicle door 414. Pad 424 is not mounted on the vehicle, but is resiliently urged by spring 426 towards pad 422 forming a segment equivalent to that shown in FIG. 34A. The wiring harness is routed in the space between the door panel 428 and the interior trim panel 430. The wiring harness assumes a configuration between pads 422 and 424 as in FIG. 34A. When the door 414 is opened as in FIG. 35B, the wiring harness is "stretched" in a common flat plane between pads 422 and 424 to accommodate the movement as in FIG. 34B. When the door is closed again, the spring 426 urges the wiring harness to again assume the relaxed position shown in FIG. 34A.

The flexibility of the wiring harness of this invention within a common flat plane enabling the wiring harness to be mounted in narrow spaces such as between door panel 428 and interior trim panel 430 provides other advantages. For instance, the wiring harness in FIG. 34A is located inside the seal created by weather-stripping 432 against vehicle door 414. This protects the wiring harness against adverse environmental conditions when the door is closed. Conventional bundled wiring harnesses are typically routed adjacent hinge 416 between the vehicle body and the door. However, this is outside of the weather stripping 432 with obvious adverse consequences. Further, the wiring harness of this invention is easier to install on a vehicle as shown in FIGS. 35A and 35B, than bundled wiring harnesses that are typically routed through apertures in the vehicle body and door. Also, the wiring harness of this invention may be installed, and the door attached to the vehicle body at a later point in the assembly of the vehicle, than when bundled wiring harness are utilized.

Figure 36:
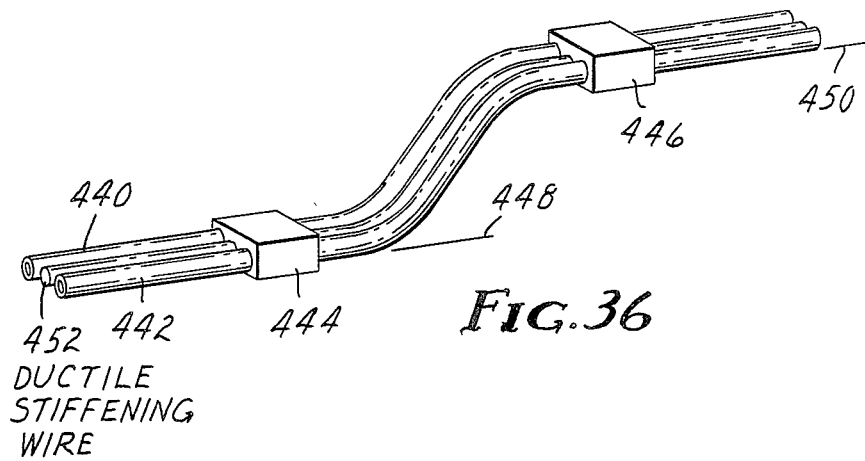
FIG. 36 is a segment of wiring harness according to this invention with two pads in different planes and the wires between them bent to transition from one plane to the other.

FIG. 36 shows a segment of a wiring harness having a pair of wires 440 and 442 extending through pads 444 and 446. The wires define a first plane 448 adjacent pad 444. The wires are bent intermediate pads 444 and 446 out of the plane 448 so that the wires transition to a second plane 450 after emerging from pad 446. Although the planes 448 and 450 are depicted as parallel, it is recognized that the planes may be inclined with respect to each other. The adaptability of the wiring harness thus constructed is evident not only in a single common flat plane, but over a complex and non-planar surface as may be frequently encountered in support structures.

Further, the spacing of the pads, and the size and ductility of the wires and the number of strands in the wires may be selected so that the wires may be bent intermediate the pads, both within and out of a common plane defined by the row of wires and then retain the bent configuration. In other applications, the size and construction of the wires and the spacing of the pads may require the use of a ductile stiffening member 452 extending between pads 444 and 446 in FIG. 36 to maintain a desired profile for the wiring harness.

What is claimed is:

1. A wiring harness and support structure for conveying energy with respect to the support structure, comprising:
   (a) at least two wires having opposed ends and arranged in a row for transmitting energy therethrough;
   (b) at least two spaced pads extending generally transverse to said wires intermediate said opposed ends of said wires and through which said wires extend in spaced relationship to each other, said pads being molded about said wires; and
   (c) mounting means for securing at least two of said pads to said support structure so that said pads support and position said wires with respect to said support structure.

2. The wiring harness and support structure of claim 1 wherein said mounting means projects from one or more of said pads for mounting said pads at a desired location on the support structure.

3. The wiring harness and support structure of claim 2 wherein said mounting means includes a barbed prong projecting from one of said pads for penetration into the support structure so as to mount said pad to the support structure.

4. The wiring harness and support structure of claim 1, wherein said mounting means includes at least one mounting member projecting from the support structure for engagement with one of said pads for securing said pad to the support structure.

5. The wiring harness and support structure of claim 1 further comprising indicia on at least one of said pads.

6. The wiring harness and support structure of claim 1 wherein said row of wires is longitudinally partitioned into a main cable and at least one branch cable, with said wires of said main cable extending to at least one pad separate from said branch cable.

7. The wiring harness and support structure of claim 6 wherein said branch cable extends to at least one pad separate from said wires of said main cable.

8. The wiring harness and support structure of claim 1, further including a pad molded about the end of one or more of said wires.

9. The wiring harness and support structure of claim 1 wherein said wires in said row of wires are in a common flat plane and wherein said wires are bent within said plane.

10. The wiring harness and support structure of claim 9, wherein said wires are bent about a common center of curvature within said common plane.

11. The wiring harness and support structure of claim 1 wherein said row of wires is in a common plane at a point in the wiring harness and at least one of said wires is deflected from said common plane at another point in the wiring harness.

12. The wiring harness and support structure of claim 1 including an electrical connector connected to at least one of said wires of said wiring harness for connecting said wires externally of the wiring harness.

13. The wiring harness and support structure of claim 12, wherein said connector comprises a pad molded about the ends of one or more electrically conductive wires and including an electrically conductive contact mounted in said pad and electrically connected to one of said wires and said contact being accessible externally of said pad.

14. The wiring harness and support structure of claim 13, further including an electrical device mounted within said pad and electrically connected to one of said wires and said electrically conductive contact.

15. The wiring harness and support structure of claim 12, wherein said connector comprises a pad molded about one or more electrically conductive wires intermediate the ends of the wires and including an electrically conductive contact mounted in said pad and electrically connected to one of said wires and said contact being accessible externally of said pad.

16. The wiring harness and support structure of claim 15, further including an electrical device mounted within said pad and electrically connected to one of said wires and said electrically conductive contact.

17. The wiring harness and support structure of claim 1, wherein at least one of said pads includes means for interconnecting at least two of said wires within said pad for conveying energy therebetween.

18. The wiring harness and support structure of claim 17, wherein said interconnecting means comprises an electrical device mounted within said pad and in electrical connection with said at least two wires within said pad.

19. The wiring harness and support structure of claim 1 wherein at least one of said pads includes a surface adapted to conform to the contour of the portion of said support structure on which said pad is located.

20. The wiring harness and support structure of claim 1 wherein at least one of said pads is divided into at least two flexibly connected segments, whereby said segments of said pad are independently positioned relative to each other to conform to the contour of the portion of said support structure on which the pad is located.

21. The wiring harness and support structure of claim 1, wherein at least one of said wires is bent within one of said pads.

22. The wiring harness and support structure of claim 1, wherein the spatial relationship of said wires within said row is altered intermediate said at least two pads.

23. The wiring harness and support structure of claim 1, wherein the support structure includes two portions movable with respect to each other and the wiring harness includes at least one pad mounted on each movable portion.

* * * * *

UNITED STATES PATENT AND TRADEMARK OFFICE
CERTIFICATE OF CORRECTION

PATENT NO. : 4,874,908

DATED : November 20, 1990

INVENTOR(S) : RONALD C. JOHANSSON

It is certified that error appears in the above-identified patent and that said Letters Patent is hereby corrected as shown below:

Col. 2, line 14; delete the numeral "10".

Col. 2, line 61; insert the words --is a-- after the numeral "1".

Col. 2, line 61; insert the words --constructed according to this invention-- after the word "harness".

Col. 3, line 8; insert the words --invention with-- after the word "this".

Col. 3, line 12; insert the word --a-- before the word "pad".

Col. 4, line 5; insert the word --invention-- after the word "this".

Col. 5, line 26; "styreme" should read --styrene--.

Col. 8, line 12; "projection" should read --projections--.

Col. 13, line 24; "ads" should read --pads--.

Signed and Sealed this

Tenth Day of March, 1992

Attest:

HARRY F. MANBECK, JR.

Attesting Officer

Commissioner of Patents and Trademarks